(No Model.) 5 Sheets—Sheet 1.

J. B. HADAWAY.
CHANNELING MACHINE.

No. 484,363. Patented Oct. 11, 1892.

Witnesses:
Walter E. Lombard.
J. Clifford Entwistle

Inventor:
John B. Hadaway,
by N. C. Lombard
Attorney.

(No Model.) 5 Sheets—Sheet 2.

J. B. HADAWAY.
CHANNELING MACHINE.

No. 484,363. Patented Oct. 11, 1892.

Witnesses:
Walter E. Lombard
J. Clifford Entwistle

Inventor:
John B. Hadaway.
by N. C. Lombard
Attorney.

(No Model.) 5 Sheets—Sheet 3.
J. B. HADAWAY.
CHANNELING MACHINE.

No. 484,363. Patented Oct. 11, 1892.

Witnesses:
Walter E. Lombard.
J. Clifford Entwisle

Inventor:
John B. Hadaway,
by N. C. Lombard
Attorney.

(No Model.)  5 Sheets—Sheet 4.
J. B. HADAWAY.
CHANNELING MACHINE.

No. 484,363. Patented Oct. 11, 1892.

Witnesses:
Walter E. Lombard
J. Clifford Entwistle

Inventor
John B. Hadaway,
by N. C. Lombard
Attorney.

(No Model.) 5 Sheets—Sheet 5.
J. B. HADAWAY.
CHANNELING MACHINE.
No. 484,363. Patented Oct. 11, 1892.
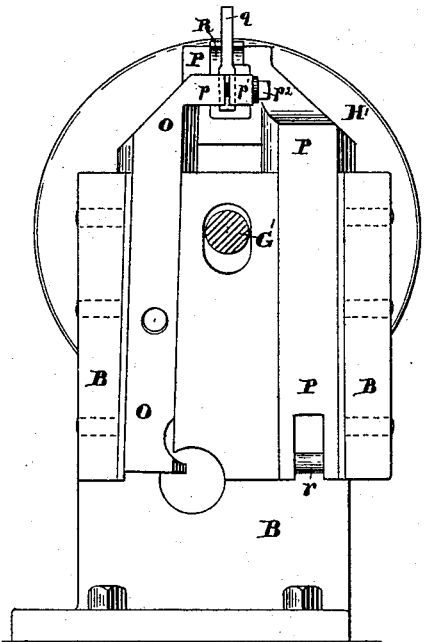
Fig. 5.
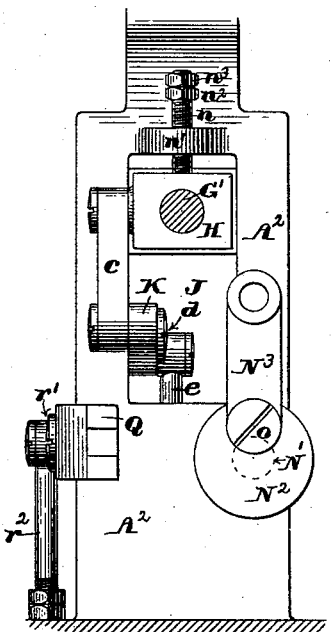
Fig. 6.
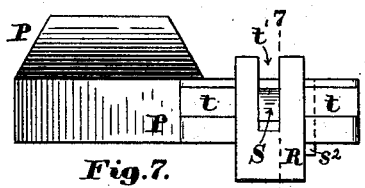
Fig. 7.
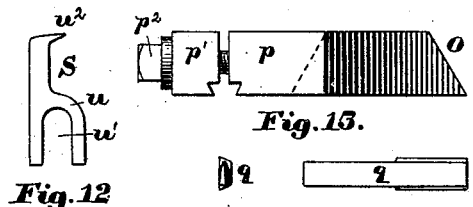
Fig. 13.
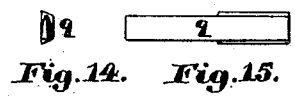
Fig. 14. Fig. 15.
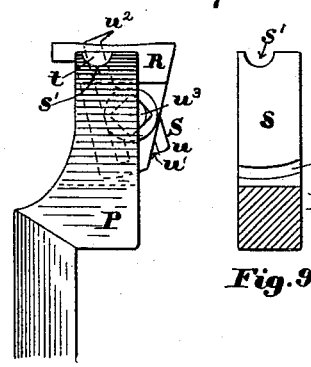
Fig. 8.
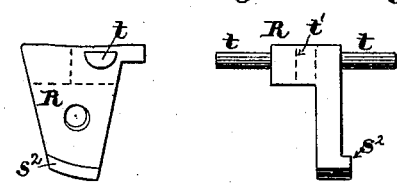
Fig. 12.
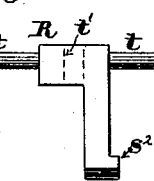
Fig. 9. Fig. 10. Fig. 11.
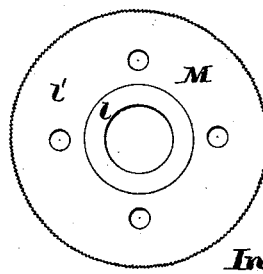
Fig. 17. Fig. 16.
Witnesses:
Walter E. Lombard
J. Clifford Entwisle
Inventor:
John B. Hadaway,
by N. C. Lombard Attorney.

UNITED STATES PATENT OFFICE.

JOHN B. HADAWAY, OF BROCKTON, ASSIGNOR, BY MESNE ASSIGNMENTS, TO JOSEPH S. TURNER, OF ROCKLAND, MASSACHUSETTS.

CHANNELING-MACHINE.

SPECIFICATION forming part of Letters Patent No. 484,363, dated October 11, 1892.

Application filed July 15, 1891. Serial No. 399,576. (No model.)

*To all whom it may concern:*

Be it known that I, JOHN B. HADAWAY, of Brockton, in the county of Plymouth and State of Massachusetts, have invented certain new and useful Improvements in Boot or Shoe Sole Channeling Machines, of which the following, taken in connection with the accompanying drawings, is a specification.

My invention relates to machines for channeling the soles of boots or shoes, and is an improvement upon the machine described and illustrated in the Letters Patent No. 449,247, granted to me March 31, 1891; and it consists in certain novel features of construction, arrangement, and combination of parts, which will be readily understood by reference to the description of the drawings and to the claims hereinafter given, and in which my invention is clearly pointed out.

Figure 1:
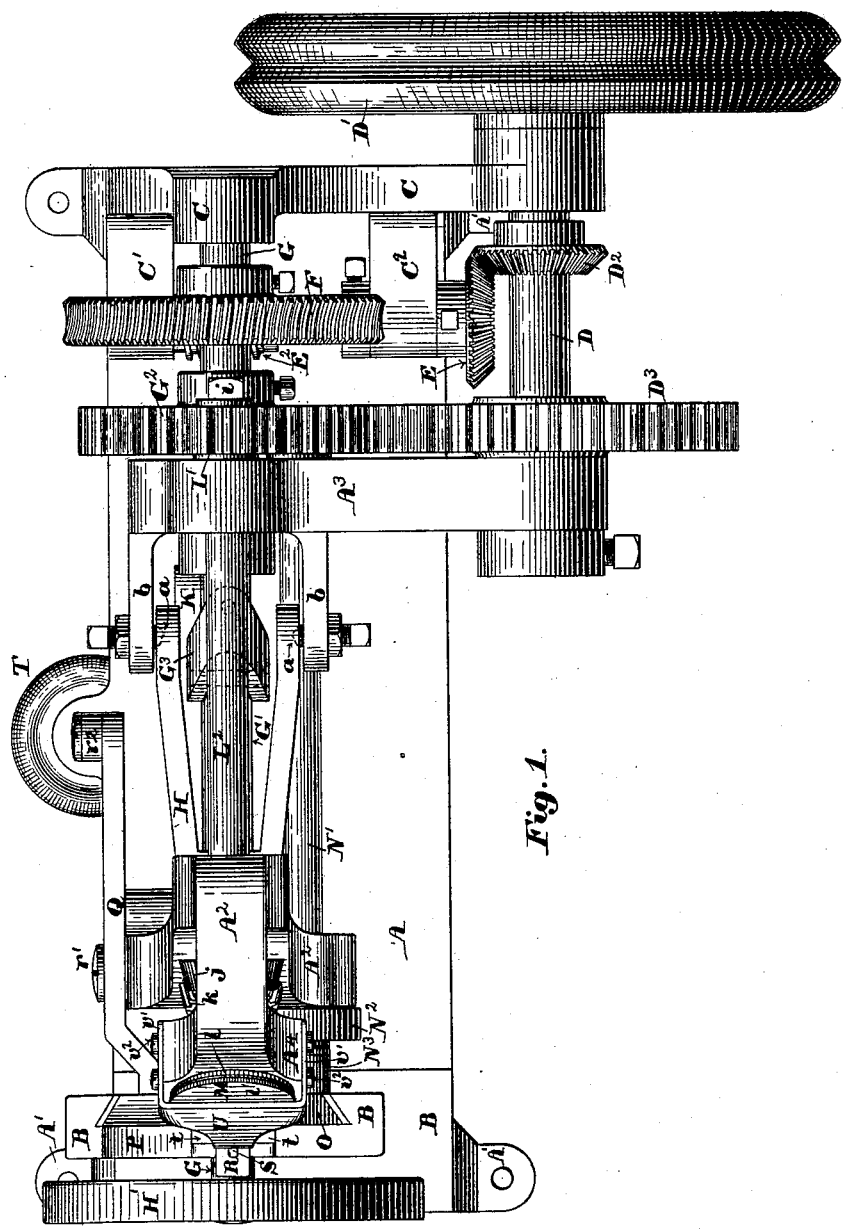
Figure 2:
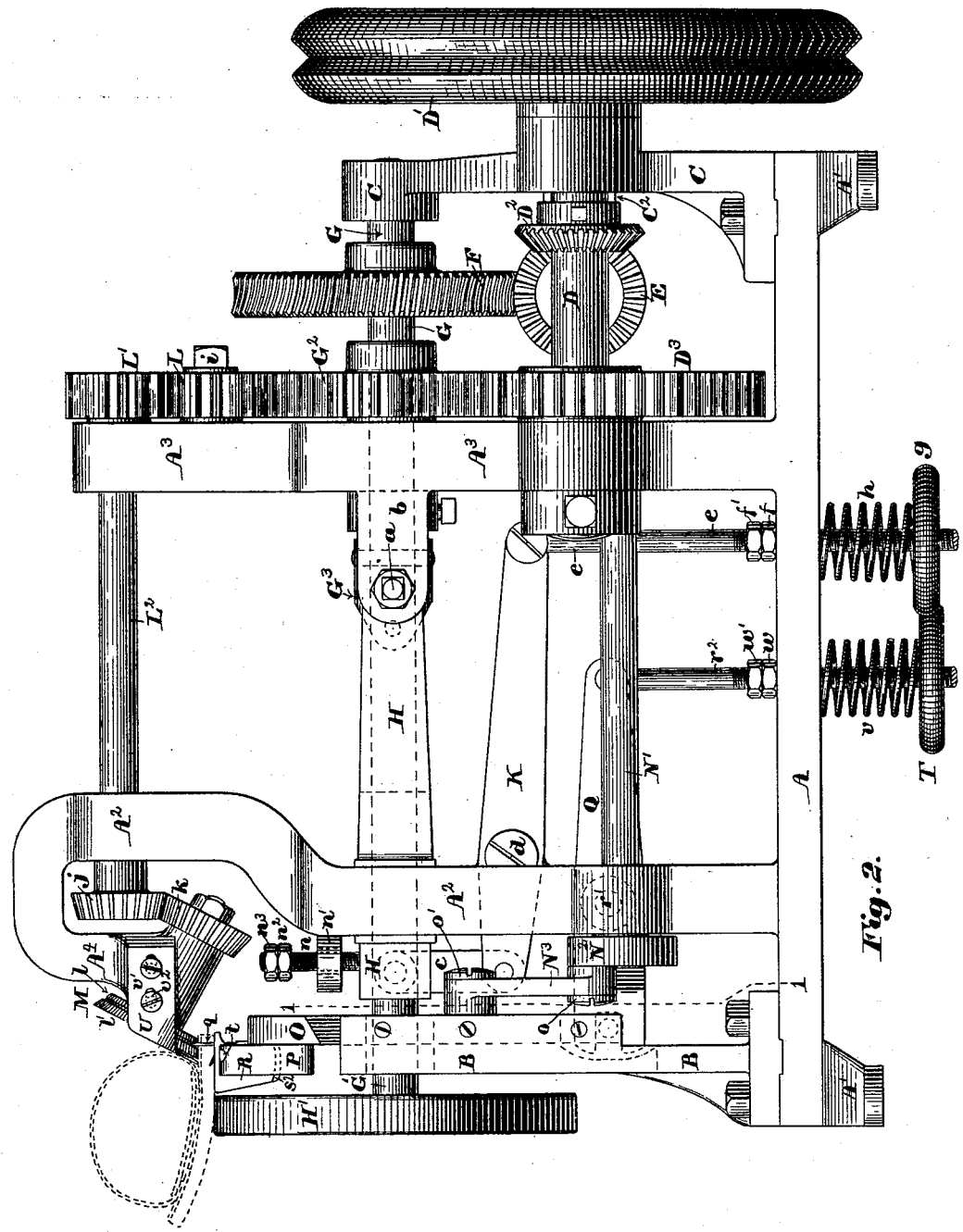
Figure 3:
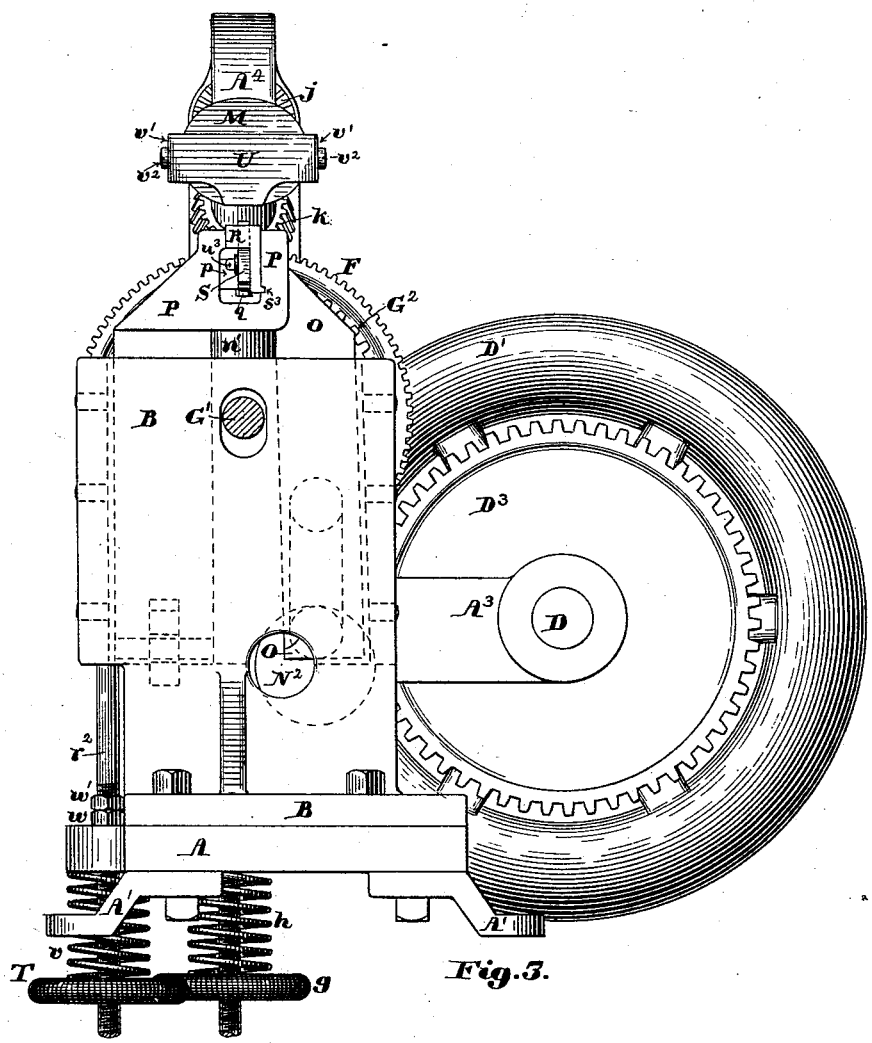
Figure 4:
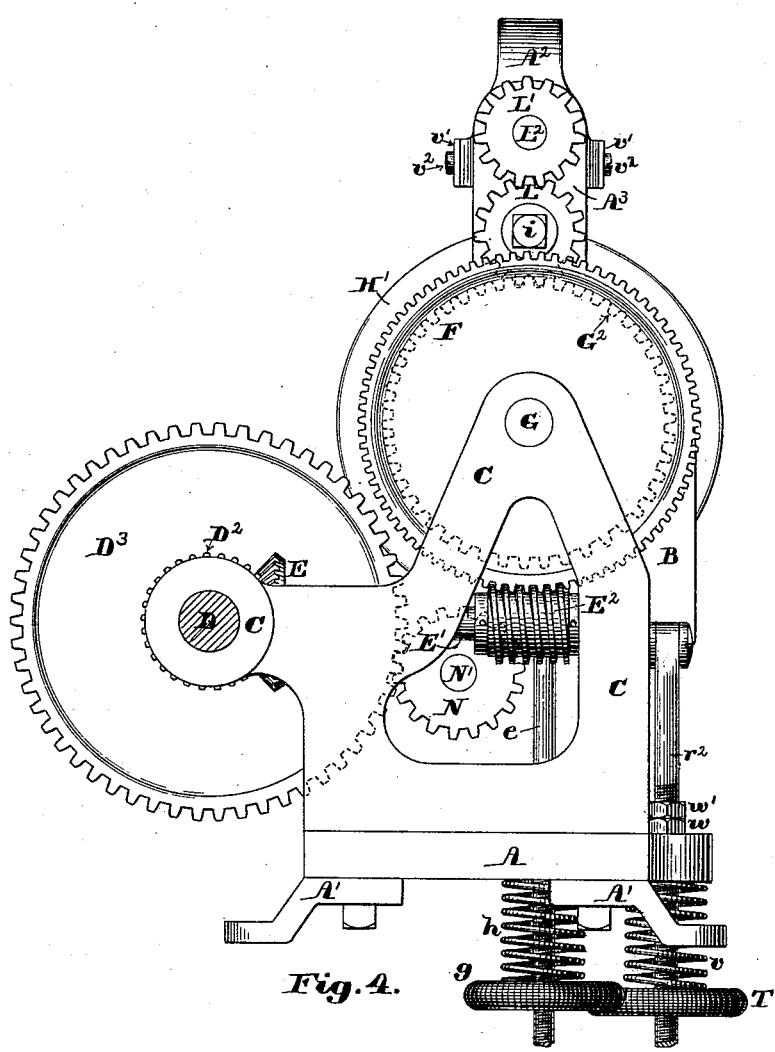

Figure 1 of the drawings is a plan of a machine illustrating my invention. Fig. 2 is a side elevation of the head or main body of the machine, the supporting-table and the treadles being omitted. Fig. 3 is a front elevation of the same with the work-supporting wheel cut away. Fig. 4 is an elevation of the rear end of the same. Fig. 5 is an elevation of the trimming-cutter, the channel-cutting knife, their supporting-stand, and the work-supporting disk or wheel, looking toward the left of Fig. 2, the disk-carrying shaft being cut in section on line 1 1 on Fig. 1. Fig. 6 is a vertical section through the disk-carrying shaft on line 1 1 on Fig. 2 and showing the parts immediately in the rear or to the right of said line in elevation. Fig. 7 is a plan of the channel-cutting knife, its holder, and the slide-bar for supporting said holder. Fig. 8 is a partial side elevation of the same parts. Fig. 9 is a section of the holder-carrying slide on line 7 7 on Fig. 7. Figs. 10 and 11 are respectively a side elevation and an edge view of the channel-knife holder. Fig. 12 is an elevation of the rear side of the channel-cutting knife. Fig. 13 is a plan of the trimming-knife holder. Figs. 14 and 15 are respectively a plan and a front elevation of the trimming-knife. Figs. 16 and 17 are respectively a front elevation and a central longitudinal section of the feed-wheel.

In the drawings, A is the bed of the machine, having formed thereon or secured thereto the feet A' A', by which it is secured upon any suitable table. (Not shown.) The bed A has formed in one piece therewith or secured thereto the stands or uprights $A^2$, $A^3$, B, and C, arranged relative to each other, as shown in Fig. 2.

D is the driving-shaft, mounted in bearings in the stands $A^3$ and C and having mounted thereon the driving-wheel D', the miter gear-wheel $D^2$, and the spur gear-wheel $D^3$, as shown in Figs. 1 and 2. The miter-gear $D^2$ engages with a similar gear-wheel E, secured upon one end of the shaft E', mounted in bearings in ears C' and $C^2$, projecting from the stand C, and having formed thereon or secured thereto the worm-screw $E^2$, which engages with and imparts motion to the worm-wheel F, mounted upon the shaft G, which is mounted in bearings in the stands $A^3$ and C and has secured thereon the spur gear-wheel $G^2$, all as shown in Figs. 1, 2, and 4. The front end of the shaft G is connected by a gimbal-ring $G^3$ to the shaft G', which has a bearing in the forward end of the forked lever H and has secured to its front end the work-supporting disk or wheel H', having a smooth cylindrical periphery, all as shown in Figs. 1, 2, and 4. The forked end of the lever H is pivoted at $a$ to ears $b$ $b$, which project from the front side of the standard $A^3$, as shown in Figs. 1 and 2. The forward end of said lever is made rectangular and fitted to the slot J in the standard $A^2$, so as to be guided thereby in its up and down movements, and has pivoted thereto the upper end of the link $c$, the lower end of which is pivoted to the front end of the lever K, which in turn is pivoted at $d$ to the standard $A^2$ and has pivoted to its rear end the upper end of the rod $e$, the lower end of which is connected to a treadle-lever, (not shown,) by depressing which the work-supporting disk or wheel H' may be depressed to enable the operator to change the angle of the tread-surface of the sole when channeling the shank, so as to cut the channel farther from the edge of the sole. The rod $e$ passes through the bed A and is provided with a stop-nut $f$ and check-nut $f'$ to limit its downward movement and with the adjustable wheel-like nut $g$, between which and the under side of the bed A it is surrounded by the spring $h$, which tends to move said rod downward and thus raise the work-supporting wheel H' and maintain the upper surface of the sole in firm contact with the periphery of the feed-wheel. The spur gear-wheel $G^2$ engages with the pinion L, mounted on a stud $i$, set in the standard $A^3$, and said pinion engages with a similar pinion L', secured on the rear end of the shaft $L^2$, mounted in bearings in the standards $A^2$ and $A^3$ and having secured on its front end the bevel gear-wheel $j$, which engages with a similar bevel gear-wheel $k$, secured upon the inner end of a short shaft mounted in an oblique position in the pendent portion $A^4$ of the standard $A^2$ and having secured upon its front end the feed-wheel M, all as shown in Fig. 2. The feed-wheel M is preferably made in two parts $l$ and $l'$, screwed together and having beveled peripheries, the inner corners of each of which are rabbeted, so that when screwed together an annular dovetailed groove is formed in the periphery of said wheel, which groove is filled with a ring $m$, of hard rubber, rawhide, soft metal, or other suitable material to form a surface for the trimming-knife to cut against. The periphery of the feed-wheel is serrated or roughened upon each side of the ring $m$ to insure the proper feeding of the work as said wheel is rotated. The front end of the forked lever H has set in its upper side the threaded stud $n$, which projects upward through an opening in the ear $n'$, projecting from the front side of the standard $A^2$, and has fitted thereto above said ear the stop-nut $n^2$ and check-nut $n^3$ to limit the downward movement of the front end of said lever, and consequently of the work-supporting wheel H'. The spur gear-wheel $D^3$ on the shaft D engages with and imparts motion to the pinion N, firmly secured upon the shaft N', mounted in bearings in the standards $A^2$ and $A^3$, and has secured upon its front end the crank-disk $N^2$, having set therein the crank-pin $o$ to receive one end of the connecting-rod $N^3$, the other end of which is connected by the pin $o'$ to the trimming-knife holder O, as shown in Fig. 2. The trimming-knife holder O is composed of the main body, made dovetailed in cross-section and provided with the laterally-projecting portion $p$ at its upper end, and the cap or clamp $p'$, secured to the part $p$ by the clamping-bolt $p^2$, the inner faces of the parts $p$ and $p'$ having formed therein undercut or dovetailed rabbets to form a bearing to receive the dovetailed shank of the trimming-knife $q$, all constructed as shown in Figs. 5, 13, and 14. The trimming-knife holder is fitted to and movable up and down in a dovetailed bearing in the rear face of the stand B, said bearing being slightly inclined from a perpendicular, so that the trimming-knife in its upward movement shall move slightly toward the left of Fig. 3. The stand B has another dovetailed bearing formed in its rear face, in which is fitted so as to be movable vertically therein the dovetailed bar P, forked at its lower end and having its upper end portion offset toward the front of the machine and toward the center of the width of the stand B. The forked lower end of the bar P has set therein the pin $r$ which engages with the forked front end of the lever Q, pivoted to the stand $A^2$ at $r'$, and having pivoted to its rear end the rod $r^2$, the lower end of which is pivoted to a treadle (not shown) in such a manner that a depression of the front end of said treadle by the foot of the operator will cause a downward movement of the bar P, for the purpose of facilitating the placing of the boot or shoe in position for channeling the sole. The offset upper portion of the bar P has formed in its upper edge the slot $s$ and the semicircular bearings $s'$ $s'$ to receive the semicircular trunnions $t$ $t$ of the channel-cutting-knife holder R, as shown. The channel-knife holder R is made of the form shown in Figs. 7, 10, and 11, being provided with the slot $t'$ in its upper end for the passage of the channel-cutting knife S and at its lower end with the laterally-projecting segmental rib $s^2$, arranged concentric with the trunnions $t$ and to fit into the segmental groove $s^3$, formed in the inner face of one wall of the slot $s$ in the bar P, all as shown in Figs. 3, 9, 10, and 11. The channel-cutting knife S is composed of the main body or stock $u$, having formed in its lower end the open slot $u'$ and the obliquely-arranged cutting-spur $u^2$, and is secured to the holder R by the clamping-bolt $u^3$, as shown in Figs. 3 and 8. The upper surface of the channel-knife holder R is curved or made lower in the middle than at its front and rear ends, so as to insure its bearing upon the sole at two points on opposite sides of its axis of motion, so that it will accommodate itself to the varying angle of the tread-surface of the sole when fitted and secured to the last, and thus maintain the channel-cutting knife always at the same relative angle to said tread-surface, whether cutting around the toe, ball, or shank of the boot or shoe. The rod $r^2$ passes through the bed A, is provided with the adjustable wheel-nut T, and is surrounded between said nut and bed by the spring $v$, which tends to depress the rear end of the lever Q, and thus move the bar P upward into contact with the sole to be channeled. Said rod $r^2$ is also provided with the stop-nut $w$ and check-nut $w'$ to serve as a stop to limit the downward movement of said rod and the consequent upward movement of the channel-knife holder.

U is a gage or guard made of thin sheet metal and having two rearwardly-projecting ears $v'$ $v'$ at a sufficient distance apart to permit the feed-wheel M to revolve between them, as shown in Fig. 1. Said guard is adjustably secured to the pendent portion of the standard $A^2$ by the screws $v^2$ $v^2$, which pass through slots in said ears $v'$ $v'$, as shown in Fig. 2, in such a manner that said guard may be set in close proximity to the front face of the feed-wheel or farther from it, according to the projection of the sole-edge, the central portion of said guard extending downward to or nearly to the lowest part of the feed-wheel, as shown.

The operation of my invention is as follows: The shoe being lasted and the sole tacked thereto and shaped to conform to the curved tread-surface of the last, the operator, after having properly adjusted the tension of the springs $h$ and $v$ and the positions of the stop-nuts $f$ and $w$, depresses the front end of the appropriate treadle to depress the channel-cutting-knife holder R to increase the space between its upper surface and the feed-wheel, when he places the tread-surface of the sole of the shoe upon the upper surface of the wheel H' and the holder R, with the gage or guard U in contact with the upper, as shown in dotted lines in Fig. 2, when he removes his foot from the treadle, and the holder R and the channel-cutter are forced upward by the tension of the spring $h$, and the projecting portion of the sole is clamped between the feed-wheel M and the holder R, he having first so set the crank-pin $o$ that the trimming-knife will be entirely below the upper surface of the holder R. The driving-shaft being now set in motion, the trimming-knife has imparted thereto a very rapid series of reciprocations, and at the same time the shoe-sole is slowly fed toward the left of Fig. 3 against the sharp cutting-edge of the channeling-knife, the operator guiding the shoe in its movement so as to keep the upper near the sole in contact with the gage or guard U until the shoe has been fed in that direction till the toe has been reached, turned, and the entire perimeter of the sole, or so much of it as it is desired to channel, has passed between the feed-wheel and the holder R, when the holder R is again depressed and the shoe removed, the holder R rocking about its trunnions during the operation, so that the channel-cutting knife S shall maintain the same angle to the surface of the sole at all times. It will be seen that the tread-surface of the sole rests upon the wheel H' and the upper surface of the knife-holder R, and as a consequence the relative angle at which said sole is maintained depends upon the position of said wheel relative to the knife-holder as to height.

It is often desirable that the channel shall be cut farther from the edge of the sole along the shank than around the ball and toe, and also that the edge of the sole in the shank shall be trimmed at a different angle to its tread-surface than around the ball and toe. This is readily done in the use of my machine by the operator placing his foot upon the treadle connected with the rod $e$ and depressing it the requisite distance to drop the wheel H the desired distance and tipping the shoe so as to keep the tread-surface of the sole in contact with said wheel, the knife-holder R moving about the axis of its trunnions to accommodate itself to the new position of the sole and at the same time maintain the channel-knife at the proper angle to the sole.

What I claim as new, and desire to secure by Letters Patent of the United States, is—

1. In a machine for channeling and trimming the edges of soles when secured upon the last, the combination of a work-support to receive the tread-surface of the sole, a conical feed-wheel having an annular ring of hard rubber or other material let into its periphery and mounted upon an inclined revoluble shaft in position to bear upon the upper surface of the sole, a channel-cutting knife located below said feed-wheel, a fixed gage or guard plate in front of said feed-wheel and adjustable horizontally toward and from said feed-wheel, and a reciprocating trimming-cutter located below said feed-wheel and constructed and arranged to cut against the surface of the ring set in the feed-wheel.

2. The combination, in a sole-channeling machine, of a vertically-movable and revoluble work-support, a channel-cutting knife, a holder for said knife, provided with trunnions mounted in bearings and adapted to be oscillated in a plane at right angles to the plane of revolution of the work-support, a vertically-reciprocating support for said knife-holder, a conical feed-wheel mounted on a revoluble inclined shaft, and an adjustable guard-plate in front of said feed-wheel, substantially as described.

3. In a machine for channeling the soles of boots or shoes when secured upon the last, the combination of the revoluble shafts G and G', connected by the gimbal-ring $G^3$, the forked lever H, movable about a fixed pivot at one end and forming a bearing at its other end for the shaft G', the work-supporting wheel H' on said shaft G', the link $c$, pivoted at its upper end to the forward end of the lever H, the lever K, pivoted at one end to the lower end of said link $c$, the treadle-rod $e$, connected at its upper end to the lever K and passing through the bed A, the stop-nut $f$, the adjustable nut $g$, and the spring $h$, the feed-wheel M, arranged to bear upon the upper surface of the sole, and a channel-cutting knife located below said feed-wheel, substantially as described.

4. The combination of the conical feed-wheel M, made in two parts, with a ring of hard rubber, rawhide, or other suitable material inserted between said parts to form a cutting-surface and mounted upon an inclined shaft, suitable gears and shafting for revolving the same, the trimming-knife $q$, the trimming-knife stock or holder O, fitted to and movable endwise in a bearing slightly inclined to a perpendicular, the connecting-rod $N^3$, pivoted at its upper end to the holder O, and the revoluble crank-shaft N', and the crank $N^2$, mounted on said shaft and connected to the connecting-rod N, all constructed, arranged, and adapted to operate substantially as described.

5. The combination, with a suitable work-support and feed-wheel, of the vertically-movable bar P, having the offset upper portion provided with the slot $s$, having formed in one wall thereof the segmental groove $s^3$, and provided on each side of said slot $s$ with the semicircular bearings $s'$ $s'$, the knife-holder R, provided with the semicircular trunnions $t\ t$, the segmental rib $s^2$, and the slot $t'$, the channeling-knife S and its holder, carried by the bar P, the lever Q, the treadle-rod $r^2$, the stop-nut $w$, the spring $v$, and the tension-adjusting nut T, all constructed and arranged substantially as described.

6. The combination, with the conical feed-wheel M, the vertically-movable and oscillating channel-knife holder R, and the channel-cutting knife carried by said holder, a horizontally-adjustable guard-plate mounted in front of said feed-wheel, substantially as described.

In testimony whereof I have signed my name to this specification, in the presence of two subscribing witnesses, on this 10th day of July, A. D. 1891.

JOHN B. HADAWAY.

Witnesses:
 N. C. LOMBARD,
 WALTER E. LOMBARD.